(12) United States Patent
Lian et al.

(10) Patent No.: US 7,937,362 B1
(45) Date of Patent: May 3, 2011

(54) SYSTEM AND METHOD FOR FACILITATING A CREDIT SYSTEM IN A PEER-TO-PEER CONTENT DELIVERY NETWORK

(75) Inventors: Qiao Lian, Sanming (CN); Xinyan Zhang, Nanjing (CN)

(73) Assignee: Roxbeam Media Network Corporation, Road Town, Tortola (VG)

( * ) Notice: Subject to any disclaimer, the term of this patent is extended or adjusted under 35 U.S.C. 154(b) by 212 days.

(21) Appl. No.: 11/413,941

(22) Filed: Apr. 28, 2006

(51) Int. Cl.
*G06F 7/00* (2006.01)
(52) U.S. Cl. ...................................... 707/622
(58) Field of Classification Search .................. 707/821, 707/809, 641, 622
See application file for complete search history.

(56) References Cited

U.S. PATENT DOCUMENTS

| | | | |
|---|---|---|---|
| 7,107,285 B2 * | 9/2006 | von Kaenel et al. | 707/104.1 |
| 2004/0260701 A1 * | 12/2004 | Lehikoinen et al. | 707/10 |
| 2005/0256796 A1 * | 11/2005 | Haga et al. | 705/37 |
| 2006/0149745 A1 * | 7/2006 | Mengerink | 707/10 |
| 2006/0168225 A1 * | 7/2006 | Gunning et al. | 709/226 |
| 2006/0200736 A1 * | 9/2006 | Smit et al. | 715/500 |
| 2006/0206486 A1 * | 9/2006 | Strickland | 707/9 |
| 2007/0094279 A1 * | 4/2007 | Mittal et al. | 707/100 |

OTHER PUBLICATIONS

W. R. Stevens, "TCP/IP Illustrated," vol. 1, Ch. 1 et seq., Addison-Wesley (1994).

X. Zhang et al., "Coolstreaming/DONet: A Data-driven Overlay Network for Peer-to-Peer Live Media Streaming," INFOCOM 2005, 24th Ann. Jt. Conf of the IEEE Comp. and Comm. Societies, Proc. IEEE vol. 3, 13-17, pp. 2102-2111 (Mar. 2005).

* cited by examiner

*Primary Examiner* — Pierre M Vital
*Assistant Examiner* — Truong V Vo
(74) *Attorney, Agent, or Firm* — Park, Vaughan, Fleming & Dowler LLP; Shun Yao

(57) ABSTRACT

A system and method facilitate a credit system for providing user incentives to encourage data sharing in a P2P network. The credit system maintains a user credit database and respectively increases or decreases a user's credits based on the data uploaded to or downloaded from other peer nodes. The credit system can also associate a user's credits with economic value or rewards to encourage the user to share data with other peer nodes. In one embodiment, the credit system maintains a credit record for each user. The credit system increases the credit for a user based on the amount of data a peer node associated with the user uploads to other peer nodes in the P2P network. The credit system also decreases the credit for the user based on the amount of data downloaded by the peer node associated with the user.

12 Claims, 8 Drawing Sheets

| USER ID | CREDIT BALANCE | UNVERIFIED | |
|---|---|---|---|
| ALICE | -$9.80 | UPLOADED | |
| | | TO | AMOUNT |
| | | BOB | 48 MB |
| | | ⋮ | ⋮ |
| | | DOWNLOADED | |
| | | FROM | AMOUNT |
| | | CHARLIE | 52 MB |
| | | ⋮ | ⋮ |
| BOB | $14.50 | UPLOADED | |
| | | TO | AMOUNT |
| | | CHARLIE | 122 MB |
| | | DALE | 279 MB |
| | | ⋮ | ⋮ |
| | | DOWNLOADED | |
| | | FROM | AMOUNT |
| | | ⋮ | ⋮ |

FIG. 5

SYSTEM AND METHOD FOR FACILITATING A CREDIT SYSTEM IN A PEER-TO-PEER CONTENT DELIVERY NETWORK

FIELD OF THE INVENTION

The present invention relates to techniques for on-line credit provisioning. More specifically, the present invention relates to a system and method for facilitating a credit system to provide user incentives and manage user credentials in a peer-to-peer overlay network.

BACKGROUND OF THE INVENTION

The ubiquity of Internet connectivity and the unprecedented growth in network access bandwidth have been fueling the demand for more versatile forms of on-line content. In particular, content providers are catering to an increasing demand for multi-media content, such as audio and video, over the Internet. Existing Internet applications fail to provide an effective means for delivery of bandwidth-intensive multi-media content to end-users.

Currently, video is one of the most bandwidth-demanding forms of on-line content. Traditionally, video, particularly live video, and audio, have been broadcast over cable programming networks. Thus, bandwidth-demanding video signals, such as television (TV) content, have only been offered by the cable programming networks. Even though broadband cable service can provide both data-communication connectivity and cable programming to end-users, cable programming is often carried separately from data services. Consequently, end-users are not able to enjoy high-bandwidth audio or video content over broadband networks that offer Internet connectivity, but not cable programming.

Additionally, successful delivery of high-quality video and audio content over an Internet connection is subject to several service constraints. Historically, access bandwidth has been considered as a bottleneck to throughput. For example, dial-up Internet services generally limit access bandwidth to 56 Kbps. Recent developments in access technologies, such as ADSL, VDSL, direct Ethernet connection, and WLAN, have largely removed this bottleneck by bringing multi-Mbps connections to end-users. Nevertheless, factors other than bandwidth limits, such as server overloading and network congestion, can still pose potential service constraints.

Often, service constraints not directly resulting from limited link bandwidth are side-effects of centralized data transfer, where media content is delivered based on a client-server model. An end-user starts a client program, which contacts a server where the media content is stored, and downloads the content from the server. Even where the network connection provides sufficient bandwidth to accommodate multiple video channels, the server may still become overloaded whenever numerous end-users request streaming video simultaneously. In addition, the connection may be congested with other network traffic. High-performance servers and high-bandwidth network connections can mitigate these problems, but such solutions often are not scalable and can increase service-provisioning costs.

Peer-to-peer overlay (P2P) networks have attracted growing interest as one solution to delivering high-quality video content. A P2P network is formed as part of an application layer that operates over a conventional network-layer infrastructure, such as the Internet. In a P2P network, peer nodes are "aware" of the states of other peer nodes. The task of content delivery is not undertaken by one particular server, and a group of peer nodes can directly exchange data or services among themselves. Thus, P2P networks provide a favorable environment for delivering streaming data, such as video, because server overloading is avoided and network congestion is reduced. P2P networks also scale gracefully as users increase.

The successful operation of a P2P network depends in part on the number of participating users who are willing to share their data via their peer nodes. However, a user might be reluctant to share his data with other. Similarly, where users frequently move newly-downloaded data to a private storage location, such as a non-shared directory, data sharing opportunities become scarce. Such user behavior is partly due to the fact that sharing data can take up extra bandwidth and CPU resources. As a result, a lack of user incentives to share data can indirectly degrade a P2P network's performance and impair user downloading experience. The accompanying frustration could further hinder user participation and further reduce data availability. In the worst case, a vicious cycle could occur and cause the P2P network to fail due to lack of user participation.

Hence, a need arises for a system and method for motivating users to share their data in a P2P network.

SUMMARY OF THE INVENTION

A system and method facilitate a credit system for providing user incentives to encourage data sharing in a P2P network. The credit system maintains a user credit database and respectively increases or decreases a user's credits based on the data uploaded to or downloaded from other peer nodes. The credit system can also associate a user's credits with economic value or rewards to encourage the user to share data with other peer nodes.

In one embodiment, the credit system maintains a credit record for each user. The credit system increases the credit for a user based on the amount of data a peer node associated with the user uploads to other peer nodes in the P2P network. The credit system also decreases the credit for the user based on the amount of data downloaded by the peer node associated with the user.

Still other embodiments will become readily apparent to those skilled in the art from the following detailed description, which describes embodiments of the invention by way of illustrating the best mode contemplated for carrying out the invention. As will be realized, the invention is capable of other and different embodiments and its several details are capable of modifications in various obvious respects, all without departing from the scope of the present invention. Accordingly, the drawings and detailed description are to be regarded as illustrative in nature and not as restrictive.

BRIEF DESCRIPTION OF THE DRAWINGS

FIG. 5 is a diagram showing an example of a user credit database in a credit system, in accordance with one embodiment.

DETAILED DESCRIPTION

The data structures, operations, and instructions described in the detailed description are typically stored on a computer readable storage medium, which may be any device or medium that can store code or data for use by a computer system. Suitable media include, but are not limited to, application specific integrated circuits (ASICs), field-programmable gate arrays (FPGAs), semiconductor memories, magnetic and optical storage devices such as disk drives, magnetic tape, CDs (compact discs), and DVDs (digital versatile discs or digital video discs). Furthermore, a computer system can be any device or system capable of processing data.

Delivery of TV Signals over Cable Programming Networks

Figure 1:
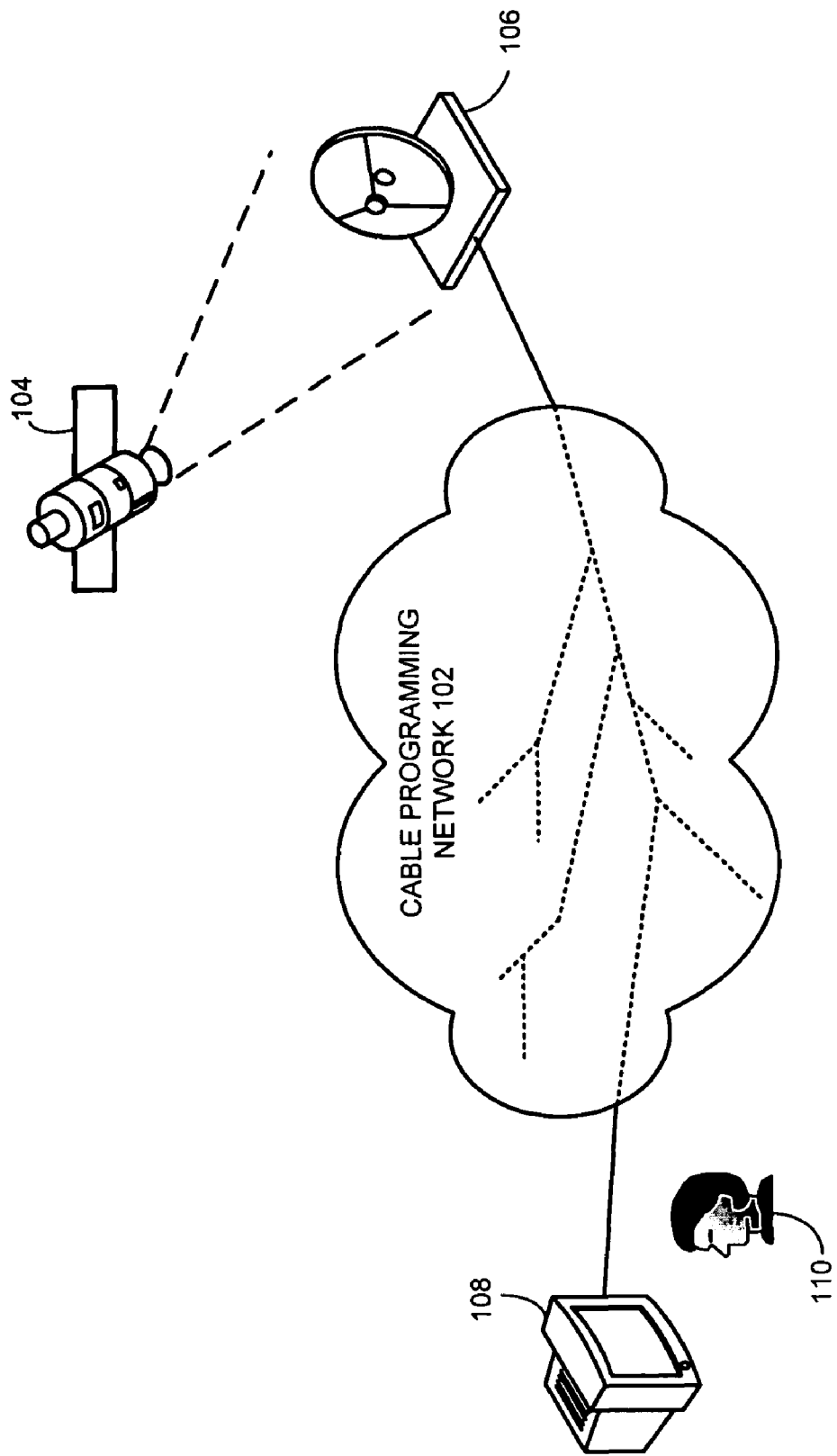
FIG. 1 is a block diagram showing a prior-art conventional cable programming network, which is used to deliver TV signals to end-users.

FIG. 1 is a block diagram showing a prior art conventional cable programming network 102 for delivering TV signals to end-users. The head-end of a cable programming network 102 is in communication with a satellite base station 106. A base station 106 receives signals for TV channels relayed by a satellite 104. The base station 106 also encodes the received TV signals and transmits the signals onto the cable programming network 102.

The cable programming network 102 can be implemented over a conventional coaxial-cable network or an optical-fiber network. At the user-end, a copper coaxial cable typically carries the TV signals into an end-user's residence or office. A TV set or receiver 108 receives the TV signals and presents the media content.

Cable networks are usually formed in tree topologies to transmit signals downstream from the head-end to the tail-end. A coaxial cable can accommodate several TV channels simultaneously due to the large bandwidth available. In contrast, accommodating simultaneous transmission of multiple TV channels over an Internet connection can be difficult due to significantly less available bandwidth in an access network.

ISPs offer Internet services over broadband cable networks, which provide significantly higher downstream, that is, download, bandwidth. Other types of cable networks are possible. Due to the tree topology of cable networks, upstream, that is, upload, bandwidth is shared by multiple Internet users and is limited on a per-user basis. Although TV signals and Internet traffic can be carried over the same physical medium, the signals are transmitted independently. As a result, TV signals are usually unavailable in networks offering Internet only connectivity.

Receiving and Presenting P2P Streaming Media Content

P2P networks have emerged as one effective solution to distributing objects that require significant network bandwidth and resources, such as audio or video files. In particular, a P2P network can deliver bandwidth-demanding streaming media over the Internet or a wireless cellular network. A node in a P2P network not only requests and receives data from other peer nodes, but also shares locally stored data with other peer nodes. Thus, a P2P-based content delivery system can avoid potential server overload and network congestion by distributing content among peer nodes.

Figure 2:
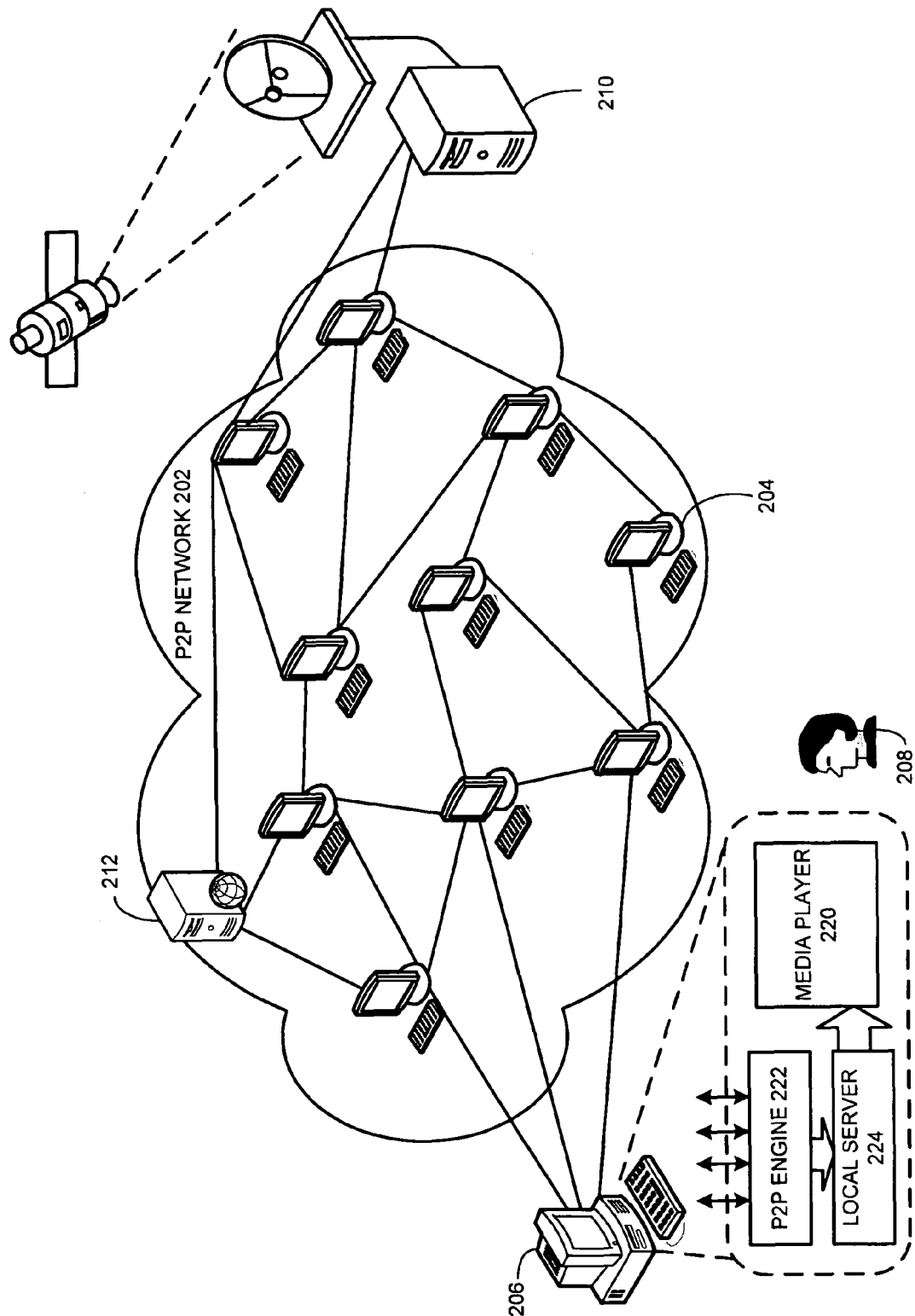
FIG. 2 is a block diagram showing a host facilitating a P2P engine and a local server for presenting streaming media content received over a P2P network.

FIG. 2 is a block diagram showing a host facilitating a P2P engine and a local server for presenting streaming media content received over a P2P network. An originating node 210 is in communication with a satellite base station and receives data for media content. The originating node 210 serves as a content source to the peer nodes within a P2P overlay network 202. Multiple peer nodes, such as computer 204, collectively form the P2P network 202. A peer node can be any device capable of receiving or transmitting data, such as a cell phone, personal data assistant (PDA), or laptop computer. The P2P network 202 can be formed as a logical layer over an underlying network infrastructure, for example, the Internet or a wireless cellular network. This underlying network can be implemented in accordance with the Internet Protocol (IP), such as described in W. R. Stevens, "TCP/IP Illustrated," Vol. 1, Ch. 1 et seq., Addison-Wesley (1994), the disclosure of which is incorporated by reference. Other network infrastructures are possible.

The P2P overlay network 202 uses widely-available one-to-one packet-based communication channels. In a packet-switched IP network, packets are delivered from a source address to a destination address. The P2P overlay network 202 is an application-layer solution based on transport-layer protocols such as the User Datagram Protocol (UDP) or Transmission Control Protocol (TCP). Other network implementations or protocols are possible. The P2P network 202 uses unicast packet forwarding across participating nodes, called overlay nodes or peer nodes, and provides multicasting by copying and relaying data among the peer nodes. An example implementation of a peer node is described in X. Zhang et al., "Coolstreaming/DONet: A Data-driven Overlay Network for Peer-to-Peer Live Media Streaming," INFOCOM 2005, 24th Ann. Jt. Conf of the IEEE Comp. and Comm. Societies, Proc. IEEE Vol. 3, 13-17, pp. 2102-2111 (March 2005), the disclosure of which is incorporated by reference.

The originating node 210 sends media content to neighboring nodes, which are in communication with other peer nodes. The P2P network 202 also includes a directory server 212, which maintains a list of peer nodes that transiently stage data for the media content. In one embodiment, the directory server 212 resides on the same host as the originating node 210. The address of the directory server 212 is universally known within the P2P network 202. When joining the P2P network 202, a new peer node contacts the directory server 212 to request a list of peer nodes that transiently stage the requested content. Such peer nodes are referred to as partner nodes. The requesting node subsequently requests the content from a set of partner nodes.

The P2P network 202 facilitates delivery of both individual files and streaming media of arbitrary or pre-determined length. Hence, content can be a regular file, streamed file, or media stream of arbitrary length. For example, a user can request a live TV channel, streamed movie file as video-on-demand (VOD), or simply a data file. For VOD or non-streaming file delivery, a hash value of the content data can be used to identify the content so that when the same content is sent to multiple users, each copy can be given a different name. If the content is a media stream of arbitrary length, the content can be identified by a hash of the metadata for the media stream. Other file identification mechanisms are possible.

The content passes from node to node via intermediate communication links and propagates to an end host 206, which presents the received media content to an end-user 208. In one embodiment, a P2P engine 222 within the end host 206 is responsible for requesting the list of partner nodes, downloading data from selected partner nodes, and uploading locally stored data to other peer nodes. "Download" denotes the operation of obtaining data from other peer nodes, and "upload" denotes the operation of sending data to other peer nodes. The meaning of "download" and "upload" is thus broader than ordinarily used in a client-server context, which implies a one-to-one sharing.

The P2P engine 222 is in communication with a local server 224 in the end host 206 and shares the received data with local server 224. The local server 224 channels the received data to a media player 220, which presents the streaming content to user 208. The local server 224 allows the host 206 to use conventional media-presentation applications, which are capable of playing content directly from a location identified, for example, by a Uniform Resource Locator (URL). The media player 220 receives the data from local server 224 by identifying the URL for the local server 224. In one embodiment, the media player 220 communicates with local server 224 by identifying a local IP address assigned to the host 206. At the beginning of a P2P streaming session, local server 224 can activate the media player 220 after the P2P engine 222 has received and buffered sufficient data to start playback. The local server 224 is optional if the host 206 includes a media-presentation application that can directly fetch data from the P2P engine 206.

Figure 3:
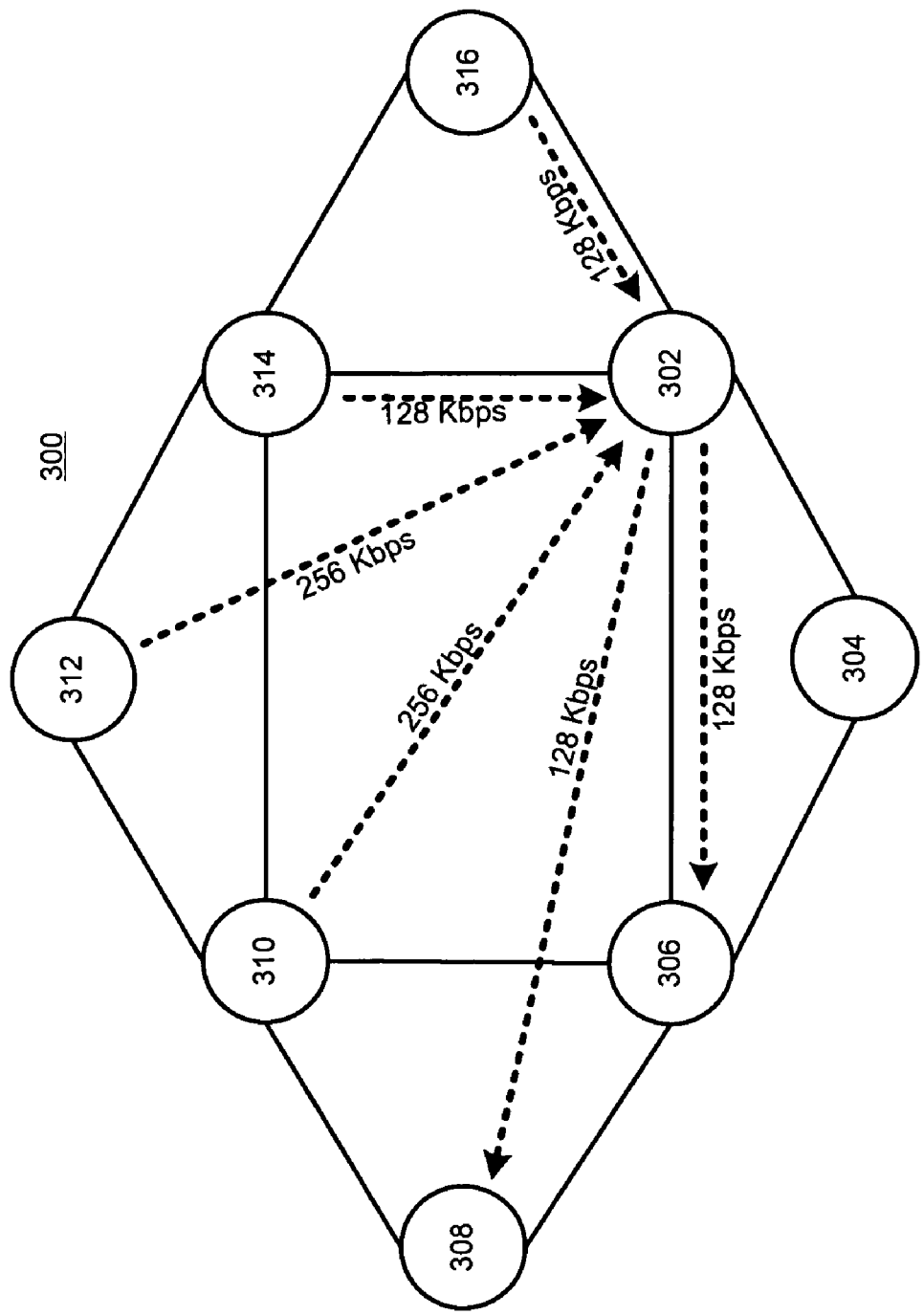
FIG. 3 is a block diagram showing an example in which a peer node simultaneously downloads and uploads streaming data from and to other peer nodes.

FIG. 3 is a block diagram showing an example in which a peer node simultaneously downloads and uploads streaming data from and to other peer nodes. A P2P network 300 includes eight ADSL peer nodes, 302-316. The ADSL peer nodes 302-316 have download bandwidth of 1 Mbps and upload bandwidth of 256 Kbps. The streaming content requires a 768 Kbps data rate for smooth playback. Although the peer node 302 cannot receive the entire 768 Kbps stream from one single partner peer node, more than one partner peer node can contribute to the streaming content delivery and the aggregate download data rate at the peer node 302 can reach 768 Kbps.

The peer node 302 receives streaming content data from four partner peer nodes 310, 312, 314, and 316. The peer node 302 receives 256 Kbps of data from each of the partner peer nodes 310 and 312, and 128 Kbps of data from each of the partner peer nodes 314 and 316 with a total effective data rate of 768 Kbps. The peer node 302 can also upload the received data to other requesting peer nodes, such as peer nodes 306 and 308. However, due to the 256 Kbps upload bandwidth limit, the peer node 302 can at most upload data at a data rate of 256 Kbps, which includes two 128 Kbps uploads to peer nodes 306 and 308.

ADSL users have less upload bandwidth than download bandwidth, and, as a result, may be reluctant to share downloaded data to avoid consuming their limited upload bandwidth and personal computing resources. However, if a majority of the P2P network users refuse upload requests, a mismatch between data supply and demand can occur and the average download data rate can fall below the required data rate for smooth playback of streaming content if the mismatch becomes prevalent. Such frustrating experiences could further discourage users from participating in the P2P network, which could eventually cause the P2P network to fail from data starvation.

Using a Credit System to Provide User Incentives

To encourage users to share their data in a P2P network, one embodiment provides a credit system implemented on a dedicated node to track a credit record for each user. A user's credit record is computed based on the amount of data downloaded from or uploaded to other peer nodes. Credit is consumed when the user uses a P2P application to download data. Credit is gained when data is uploaded. In a further embodiment, the user's credit can be associated with economic value or rewards. For example, a user can use credit points to redeem rewards, such as gift certificates, frequent flier mileage, or cash, where permitted by law. If the user downloads more data than uploaded, the user may be required to pay for any account credit deficit.

Figure 4:
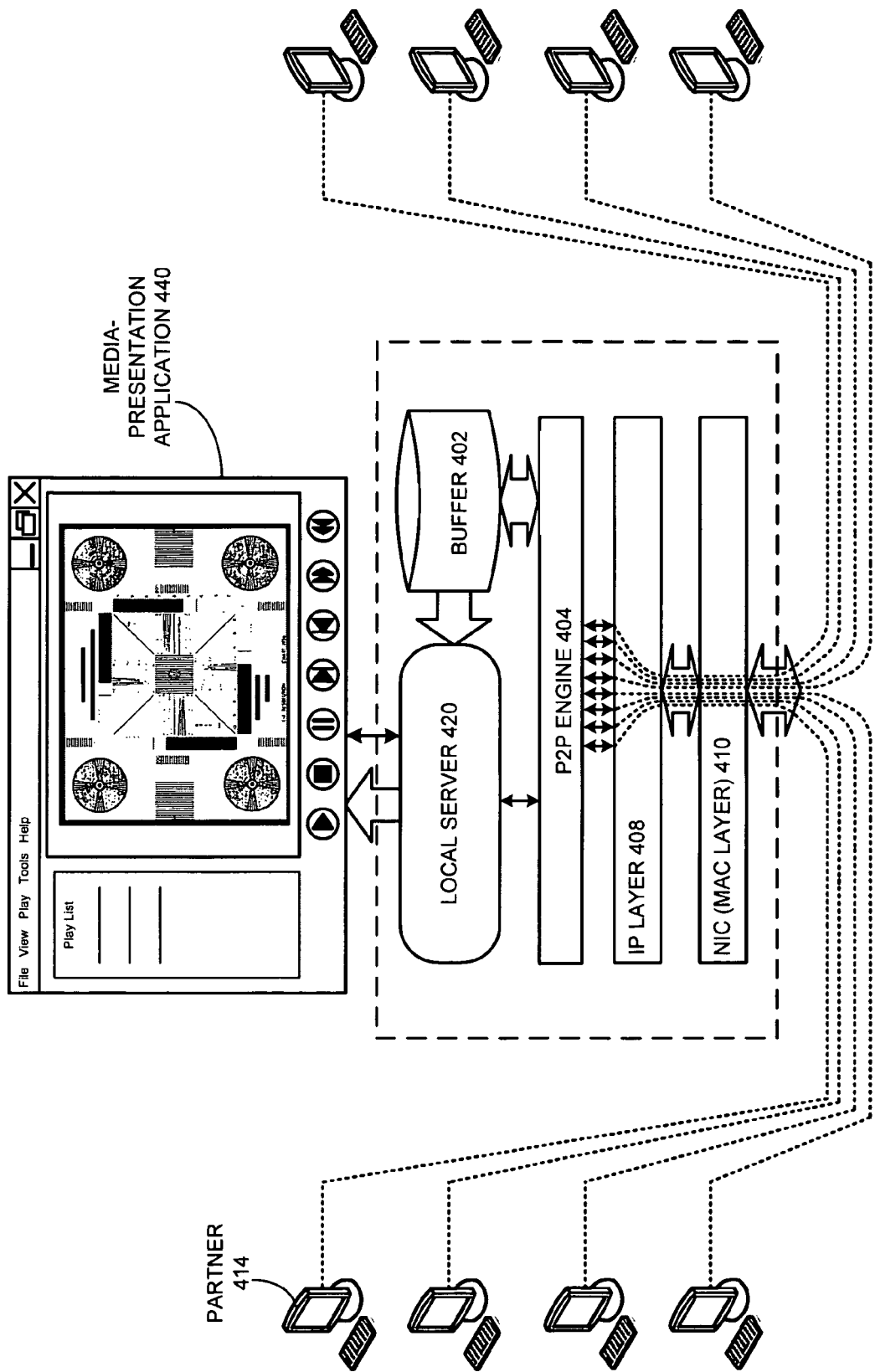
FIG. 4 is a block diagram showing an example architecture of a host facilitating a P2P engine that reports to a credit system, in accordance with one embodiment.

A P2P engine running on a peer node reports from time-to-time to the credit system the amount of data downloaded from or uploaded to other peer nodes for a given user. FIG. 4 is a block diagram showing an example architecture of a host facilitating a P2P engine that reports to a credit system, in accordance with one embodiment. An end host system includes a network interface card 410 that implements a Medium Access Control (MAC) layer and an Internet Protocol (IP) layer 408. The end host includes a P2P engine 404 and a buffer 402.

When a user logs onto the P2P application and issues a command to request content from other peer nodes, the P2P engine 404 first contacts the credit system to check the user's current credit balance. If the user has insufficient credit, the P2P application reminds the user of the insufficient credit by, for example, opening a window on the user's display to show a reminder message. If the user has sufficient credit, the P2P engine contacts a directory server to receive a list of partner peer nodes that transiently stage the content requested. The P2P engine 404 initializes a P2P session with multiple partner peer nodes to request data. The P2P engine 404 subsequently starts receiving data from the partner peer nodes and stores the received data in the buffer 402. The P2P engine 404 can also retrieve the data stored in the buffer 402 and upload that data to other peer nodes in response to data requests.

The end host further includes a local server 420, which fetches data from the buffer 402 and channels the data to a media-presentation application 440. The local server 420 is initialized when a P2P session starts. When sufficient data has been received and stored in the buffer 402, the local server 420 notifies the media-presentation application 440 to present the media content.

The P2P engine 404 from time-to-time sends download or upload reports. In one embodiment, the P2P engine 404 can report to the credit system periodically. In a further embodiment, the P2P engine 404 can report only after the amount of downloaded or uploaded data reaches a pre-determined threshold to reduce network overhead. Other reporting scenarios are possible.

The P2P engine 404 can also send a download report, upload report, or combination report. Since each peer node can allow different users to use the P2P application, the downloaded or uploaded data is associated with specific user identifiers (user IDs) to increase or decrease the current reporting user's credit. A download report can include the ID of the local downloading user and the amount of data downloaded from each peer node associated with the corresponding uploading user's ID contained, for example, in a "From" field of the report. Similarly, an upload report can contain the local uploading user's ID and the amount of data uploaded to each peer node associated with the corresponding downloading user's ID contained in, for example, a "To" field of the report.

The credit system maintains a secure credit database, further described below with reference to FIG. 5. The credit database includes a credit record for each user in the P2P network. A user's credit record includes the user's ID and the current credit balance. When a peer node sends an upload report for a user, the user's credit is increased, subject to verification of the reported uploaded data. Similarly, when the peer node sends a download report, the user's credit is decreased, subject to verification. Before downloading data for a user, a P2P engine is required to check the user's current credit balance. If the credit balance is above a pre-determined threshold, the P2P engine proceeds to request and download data from other peer nodes. If the credit balance is insufficient, the P2P engine can remind the user of the insufficient credit. The user can increase his credit by uploading data to other peer nodes or purchasing or obtaining credit with cash or other medium of agreed exchange.

Due to the distributed nature of P2P applications, a user could modify a P2P application and misrepresent the amount of uploaded or downloaded data. To prevent such abuse, the credit system verifies each upload or download report before increasing or decreasing the user's credit. Thus, a credit increase or decrease for one user should generally be mirrored by a corresponding credit decrease or increase for another user.

FIG. 5 is a diagram showing an example of a user credit database in a credit system, in accordance with one embodiment. The user credit database includes three columns, a user ID column 502, credit balance column 504, and "unverified" data column 506. The user ID column 502 stores a user ID, and the credit balance column 504 stores the associated current credit balance, such as cash or reward value. The credit system can also answer queries by peer nodes regarding a user's credit balance. When a user first logs onto a P2P application, the peer node queries the credit system to check the user's credit balance. If the credit balance is negative or below a pre-determined threshold, the P2P application reminds the user of the insufficient credit. To download any data from the P2P network, the user can increase his credit by purchasing credit or uploading data to other peer nodes.

The credit system verifies each credit report submitted by peer nodes by matching the reported information from both the transmitting and receiving peer nodes. Unverified information is temporarily stored in the "unverified" data field 506. The "unverified" data field further includes an "uploaded" data field 508 and "downloaded" data field 510. The "uploaded" data field 508 includes a "To" sub-column 512, which stores the destination user ID for the unverified uploaded data, and an "Amount" sub-column 514, which stores the amount of the unverified uploaded data. The "download" data field 510 includes a "From" sub-column, which stores the source user ID for the unverified downloaded data, and an "Amount" sub-column 518, which stores the amount of the unverified downloaded data.

For example, after receiving an upload report from user Alice reporting that her P2P application has uploaded 48 MB to user Bob, the credit system checks user Bob's "unverified" data field for unverified data downloaded from user Alice. If corroborated, the credit system reconciles user Alice's upload report with user Bob's unverified download report and leaves a balance, if any, in either user Alice's or user Bob's "unverified" data field. If user Bob's "unverified" data field does not contain an unverified "downloaded" entry from user Alice, the credit system temporarily stores the information in user Alice's upload report in her "unverified" data field. When user Bob's P2P application subsequently submits a download report reporting the downloaded data from user Alice, the credit system can check user Alice's "unverified" data field and reconcile the reports.

The credit system can assign different cash or reward values to downloaded data and uploaded data. For example, the credit system can charge 10 cents for each 1 GB downloaded and award 9 cents for each 1 GB uploaded. This differentiated crediting scheme can significantly increase user incentives to share data. A user with higher upload bandwidth can "profit" by uploading more data than downloaded. A user with low upload bandwidth, on the other hand, could be required to pay for downloading more data than uploaded as a penalty for contributing less to the P2P network.

Additionally, the P2P network operator can "profit" from this differentiated crediting scheme. For instance, if the P2P network has one million users and each user downloads and uploads 10 GB a month, the network operator can accrue up to $100,000 per month from the one-cent difference between 1 GB of downloaded and uploaded data. Other credit schemes are also possible.

Figure 6:
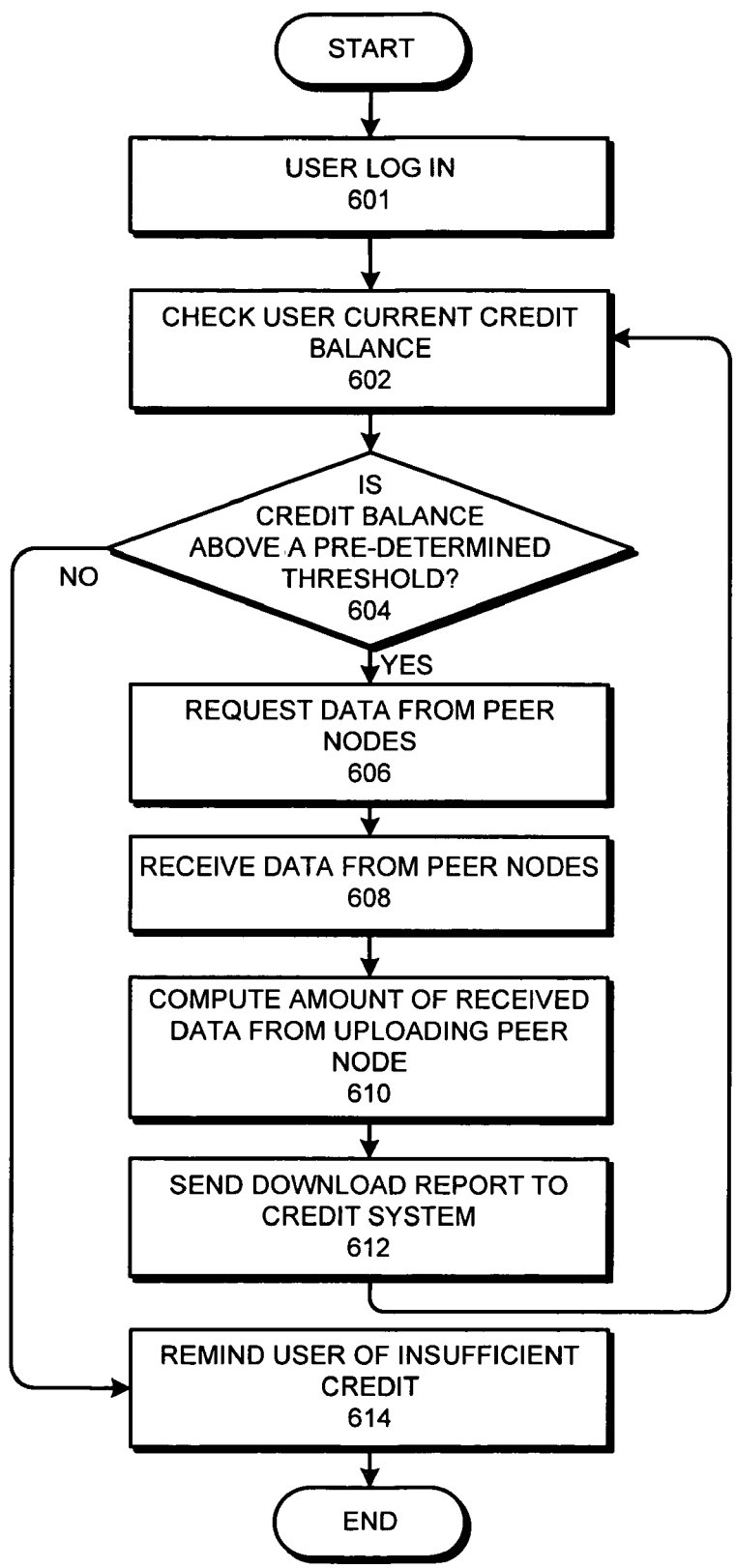
FIG. 6 is a flow chart showing the process of a peer node downloading data from other peer nodes and sending a download report to a credit system, in accordance with one embodiment.

FIG. 6 is a flow chart showing the process of a peer node downloading data from other peer nodes and sending a download report to a credit system, in accordance with one embodiment. After a user logs in (step 601), the system checks the user's current credit balance by communicating with the credit system (step 602) and determines whether the credit balance is above a pre-determined threshold (step 604). If the user has insufficient credit balance, the system reminds the user of the insufficient credit (step 614) and exits.

If the user has a sufficient credit balance, the system requests data from other peer nodes (step 606) and eventually receives the data from the peer nodes (step 608). The amount of received data from each uploading peer node is computed (step 610) and a download report is sent to the credit system (step 612). The system then again checks the credit balance (step 602) before requesting and downloading more data from the peer nodes.

Figure 7:
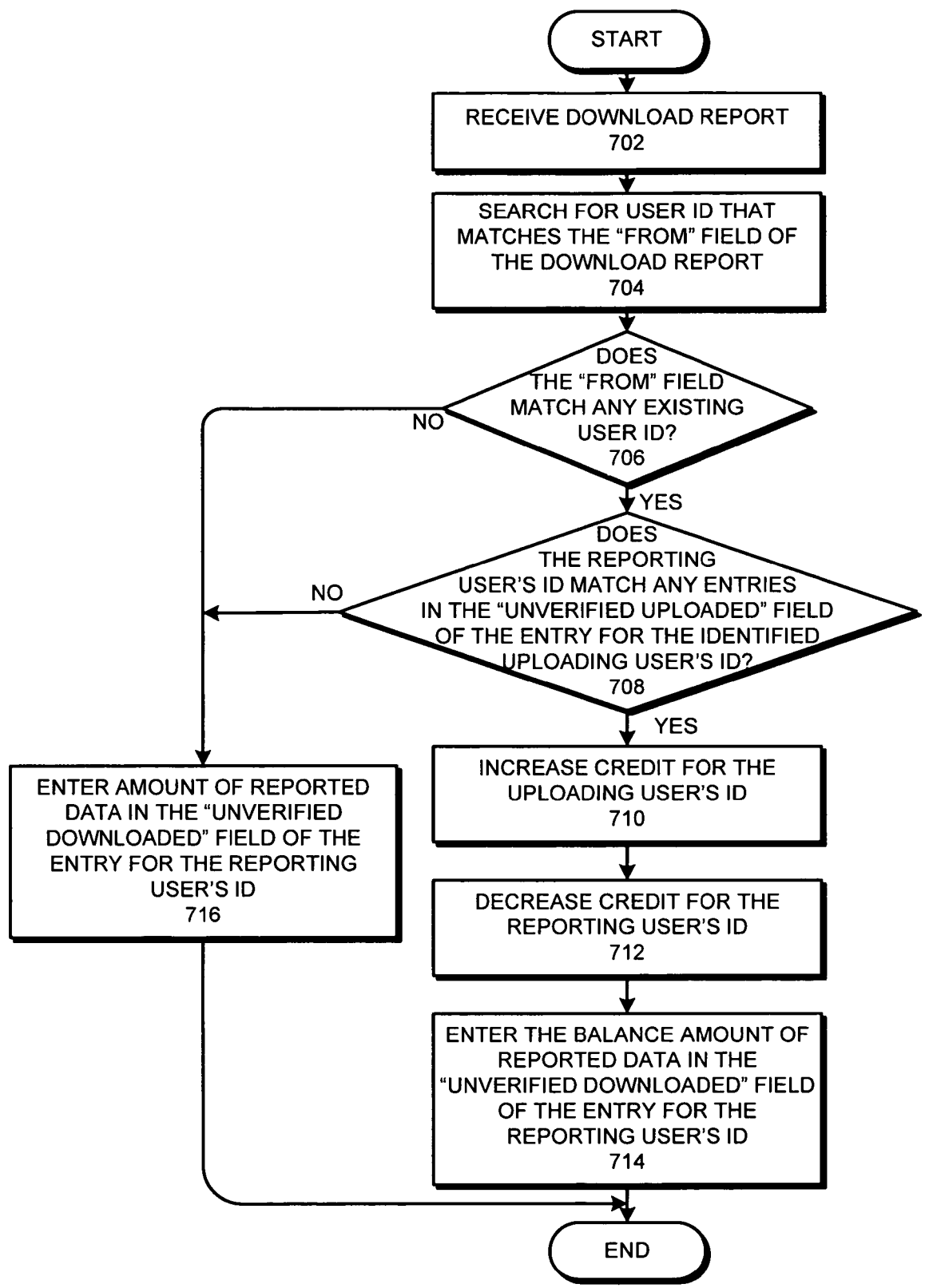
FIG. 7 is a flow chart showing the process of a credit system processing a download report sent from a peer node, in accordance with one embodiment.

FIG. 7 is a flow chart showing the process of a credit system processing a download report sent from a peer node, in accordance with one embodiment. After the system receives a download report (step 702), the system searches for a matching user ID in the download report, which indicates from which user the reporting user has downloaded data (step 704). The system determines whether the "From" field of the download report matches any existing user ID (step 706). If a match cannot be found, the system enters the amount of the reported data in the "unverified downloaded" data field for the reporting user's ID (step 716) and exits.

If a match is identified, the system further determines whether the reporting user's ID matches any entries in the "unverified uploaded" data field for the identified uploading user's ID (step 708). If a further match is not identified, the system enters the amount of the reported data in the "unverified downloaded" data field for the reporting user's ID (step 716) and exits. Otherwise, the system proceeds to reconcile the download report with the previously entered unverified entry for the uploading user by increasing the credit of the uploading user (step 710) and decreasing the credit for the reporting user (step 712). The system enters the balance amount of the reported data in the "unverified downloaded" data field for the reporting user's ID (step 714) and exits.

Figure 8:
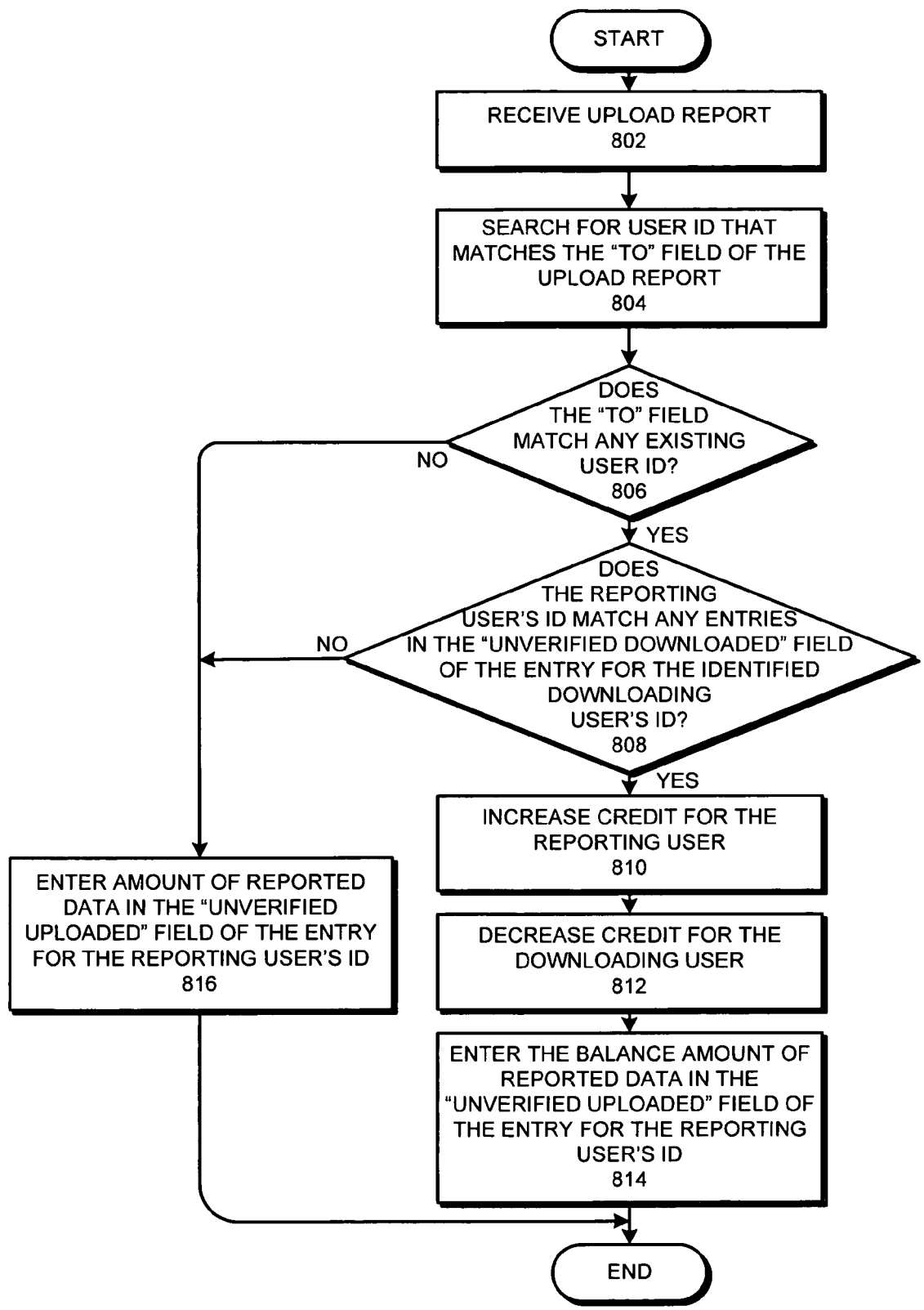
FIG. 8 is a flow chart showing the process of a credit system processing an upload report sent from a peer node, in accordance with one embodiment.

FIG. 8 is a flow chart showing the process of a credit system processing an upload report sent from a peer node, in accordance with one embodiment. After the system receives an upload report (step 802), the system searches for a matching user ID in the upload report, which indicates to which user the reporting user has uploaded data (step 804). The system determines whether the "To" field of the upload report matches any existing user ID (step 806). If a match is not identified, the system enters the amount of the reported data in the "unverified uploaded" data field for the reporting user's ID (step 816) and exits.

If a match is identified, the system further determines whether the reporting user's ID matches any entries in the "unverified downloaded" data field for the identified downloading user's ID (step 808). If a further match is not identified, the system enters the amount of the reported data in the "unverified uploaded" data field for the reporting user ID (step 816) and exits. Otherwise, the system proceeds to reconcile the upload report with the previously entered unverified entry for the downloading user by increasing the credit of the reporting user (step 810) and decreasing the credit of the downloading user (step 812). The system enters the balance amount of the reported data in the "unverified uploaded" data field of the entry for the reporting user's ID (step 814) and exits.

User Rating System

A credit system allows users to acquire credits from uploading data to other peer nodes. However, an abusive user could upload low-quality or useless data to wrongfully earn credits. In a further embodiment, a user rating system maintains a ratings record for each user. The rating system can be implemented on a dedicated node in the P2P network, and can provide user rating information in response to a request. The rating system allows each user to submit feedback for an uploading user based on the quality of the data uploaded. The rating system can adjust the overall rating for a user based on feedback submitted by other users. A downloading user can query the rating system to check an uploading user's rating before spending his credits to download data from this uploading user. If the uploading user's rating is low, the downloading user can choose not to use this uploading user, and to spend his credits with another uploading user with a higher rating.

While the invention has been particularly shown and described as referenced to the embodiments thereof, those skilled in the art will understand that the foregoing and other changes in form and detail may be made therein without departing from the scope of the invention.

What is claimed is:

1. A method for facilitating a credit system to provide user incentives in a peer-to-peer overlay (P2P) network, the method comprising:
    receiving an upload report from a first peer node, wherein an unverified entry in the upload report comprises a destination user identifier and the amount of data uploaded, by a first user associated with the first peer node to a second peer node associated with a second user;
    receiving a download report from the second peer node, wherein an entry in the download report indicates the amount of data received by the second user at the second peer node from the first peer node;
    verifying the unverified entry in the upload report by matching the amount of uploaded data and the destination user identification in the unverified entry in the upload report to the corresponding amount of downloaded data in the second user's entry and the second user's identification in the download report; and
    increasing credit for the first user in proportion to the verified amount of data uploaded by the first user from the first peer node to the second peer node; and
    decreasing credit for the second user in proportion to the verified amount of data downloaded by the second user at the second peer node from the first peer node.

2. The method of claim 1, further comprising:
    increasing an economic value of an account for the first user based on the increased credit.

3. The method of claim 1, further comprising:
    receiving a download report from the first peer node, wherein the download report indicates the amount of data downloaded by the first peer node from a second peer node associated with a second user.

4. The method of claim 1, further comprising:
    receiving an upload report from the second peer node, wherein the upload report indicates the amount of data uploaded by the second peer node to the first peer node associated with the first user.

5. The method of claim 1, further comprising:
    verifying the amount of data downloaded by the first peer node; and
    decreasing the credit for the first user with whom the first peer node is associated based on the verification.

6. The method of claim 5, further comprising:
    decreasing an economic value of an account for the first user based on the decreased credit.

7. A credit system to provide user incentive in a P2P network, the system comprising: a processor; a memory; a credit management mechanism configured to:
    receiving an upload report from a first peer node, wherein an unverified entry in the upload report comprises a destination user identifier and the amount of data uploaded, by a first user associated with the first peer node to a second peer node associated with a second user;
    receive a download report from the second peer node, wherein an entry in the download report indicates the amount of data received by the second user at the second peer node from the first peer node;
    verifying the unverified entry in the upload report by matching the amount of uploaded data and the destination user identification in the unverified entry in the upload report to the corresponding amount of downloaded data in the second user's entry and the second user's identification in the download report; and
    increasing credit for the first user in proportion to the verified amount of data uploaded by the first user from the first peer node to the second peer node; and
    decreasing credit for the second user in proportion to the verified amount of data downloaded by the second user at the second peer node from the first peer node.

8. The system of claim 7, wherein the credit management mechanism is configured to:
    increase an economic value of an account for the first user based on the increased credit.

9. The system of claim 7, further comprising:
    a report receiving mechanism configured to receive a download report from the first peer node, wherein the download report indicates the amount of data downloaded by the first peer node from a second peer node associated with a second user.

10. The system of claim 7, wherein the report receiving mechanism is further configured to:
    receive an upload report from a second peer node, wherein the upload report indicates the amount of data uploaded by the second peer node to the first peer node associated with the first user.

11. The system of claim 7, further comprising:
    a verification mechanism configured to verify the amount of data downloaded by the first peer node; and
    wherein the credit management mechanism is configured to decrease the credit for the first user with whom the first peer node is associated based on the verification.

12. The system of claim 11, wherein the credit management mechanism is configured to:
    decreasing an economic value of an account for the first user based on the decreased credit.

* * * * *